Patented Feb. 26, 1946

2,395,750

UNITED STATES PATENT OFFICE 2,395,750

UNSATURATED DERIVATIVES OF CARBAMIC ACID

Irving E. Muskat, Akron, and Franklin Strain, Norton Center, Ohio, assignors to Pittsburgh Plate Glass Company, Pittsburgh, Pa., a corporation of Pennsylvania No Drawing. Application June 8, 1942, Serial No. 446,287

8 Claims. (Cl. 260—78)

This invention relates to a new class of compounds which are N-substituted ester amides of (a) the half ester of an unsaturated alcohol and carbonic acid and (b) a polyamine. The new compounds have the structural formula:

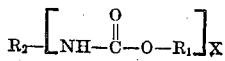

in which $R_1$ is the radical of an unsaturated alcohol, $R_2$ is the organic radical derived from a polyamine, and X is a small whole number preferably (2) two.

The unsaturated radicals $R_1$ may be the radicals derived from alcohols having from three to five carbon atoms and an unsaturated linkage in an aliphatic chain such as allyl, methallyl, 2-chloroallyl, 2-bromoallyl, propargyl, isopropenyl, crotyl, isocrotyl, chlorocrotyl, ethyl-allyl, butadienyl, tiglyl, or angelyl alcohols, methyl vinyl carbinol, ethyl vinyl carbinol, etc. The radicals may also be those derived from unsaturated alcohols having six to ten carbon atoms and having an unsaturated carbon-to-carbon linkage in an aliphatic chain such as linalool, phenylpropargyl alcohol, cinnamyl alcohol, or chlorocinnamyl alcohol.

The $R_2$ group may be derived from any polyamine such as ethylene diamine, propylene diamine, trimethylene diamine, putrescine (tetramethylene diamine), cadaverine (pentamethylene diamine), the ortho, meta-, and para-diamino benzenes, the triamino benzenes, the polyamino toluenes, etc.

The new compounds may generally be prepared by reacting an unsaturated chloroformate such as allyl chloroformate, etc., with polyamine. The substituted carbamates may be prepared by adding the chloroformate to the diamine in the presence of an alkaline reagent such as pyridine or other cyclic tertiary amine, alkali metal and alkaline earth metal hydroxides, carbonates, and oxides. The reaction is preferably conducted at temperatures between 0° C. and 20° C. Suitable solvents such as benzene, chloroform, acetone, toluene, carbon tetrachloride, xylene, and petroleum ether may be present to dissolve the reactants and/or products and permit a liquid phase reaction.

Both the mono and polyderivatives may be prepared although the polyfunctional, and especially those having two unsaturated groups, are preferred.

The $R_2$ radical may also be a divalent radical having both valence bonds attached to a single terminal carbon atoms such as ethylidene, propylidene, methylene, butylidene, etc., radicals. The new compounds so constituted are prepared by inter-reaction of an aldehyde molecule with two molecules of an amide, for example, allyl carbamate, or methallyl carbamate. Further details of this reaction may be found in copending case Serial No. 398,317, filed June 16, 1941, by Albert G. Chenicek.

The new compounds are generally solids of low melting point or liquids with relatively high boiling points. The new ester-amides are generally soluble in benzene, acetone, ether, chloroform, carbon tetrachloride, xylene, toluene, and petroleum ether.

The new compounds are capable of polymerization to form solid polymers in the presence of catalysts such as hydrogen peroxide, oxygen, organic peroxides, ultraviolet light, heat, etc. The resin products may be fabricated by methods well-known to the prior art. Accordingly, the materials may be cast polymerized with or without admixture of suitable solvents to form solid polymers of any desirable shape. Compositions may also be prepared by partially polymerizing to a fusible powder and molding by injection or fusion under pressure. Such compositions may also contain pigments, fillers, dyes, and/or fibrous reinforcement. Coating compositions may be made by incorporating in addition solvents and polymerizing a film applied to objects of wood, paper, metal or other materials.

The polymers may be modified by incorporating plasticizers or by copolymerizing in the presence of butadiene, vinyl chloride, vinyl acetate, or other vinyl compounds, phenolic resins, cellulose esters, urea plastics, acrylic esters or similar compounds, unsaturated alcohol esters of polybasic acids, vinylidene chloride, etc., or with other synthetic or natural resins.

This application is a continuation-in-part of Serial No. 361,280, filed October 15, 1940, by Irving E. Muskat and Franklin Strain.

The nature and methods of fabrication of the new materials are further set forth in the following examples:

*Example I*

Allyl chloroformate (480 grams) was added slowly to 120 grams of ethylene diamine and 300 cc. of 50 percent NaOH was simultaneously added from a separate dropping funnel. The two streams were added at such a rate that a slight excess of NaOH existed in the reaction vessel at all times. During the reaction the temperature was maintained between +3 and +18° C. A white crystalline solid separated out which was filtered, washed with water and dried. The new compound had a melting point 81–84° C. and the following structure:

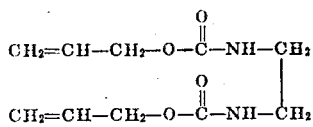

A five gram sample was mixed with .15 grams benzoyl peroxide and heated at the melting point for two hours. The material became polymerized.

*Example II*

A mixture of 175 grams of pyridine, 500 cc. benzene, and 88 grams of cadaverine was prepared and cooled to 0° C. 270 grams of methallyl chloroformate was added at the rate of 10 grams per minute. The reaction temperature did not exceed 12° C. during the reaction. The benzene solution was washed with diluted hydrochloric acid and with water. Traces of water were removed by contacting the solution with anhydrous sodium sulfate. By heating at reduced pressures the benzene and other volatile materials were vaporized leaving an oil which solidified on cooling. The material was recrystallized from acetone solution. A white crystalline solid was obtained which had the structure:

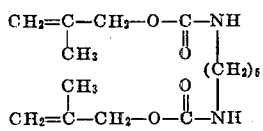

*Example III*

Allyl chloroformate and putrescine were interreacted by the procedure described in Example I. The ester-imide was a white solid with the molecular structure as follows:

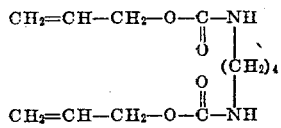

A five gram sample was mixed with .3 grams of benzoyl peroxide and heated at 135° C. in a mold under 1200 pounds per square inch pressure. A solid polymer was formed.

*Example IV*

43.3 (0.43 mole) of allyl carbamate was mixed with 17.0 g. of 37% aqueous formaldehyde (0.22 mole) and 4.5 cc. of concentrated hydrochloric acid slowly added. The mixture was stirred and cooled until it became almost solid. It was allowed to stand for about one-half hour and was then washed with water. The solid was separated by filtration, washed with water and air dried. The product was a crystalline solid which melted at 95 to 97° C. Upon heating the product with 2 percent benzoyl peroxide at a temperature of 100° C., the product polymerized to form a clear, transparent polymer.

Although the invention has been described with respect to certain specific details, it is not intended that these shall be limitations upon the scope of the invention except as incorporated in the following claims.

We claim:

1. A compound corresponding to the following structural formula:

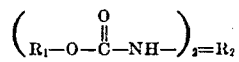

wherein $R_1$ is a radical corresponding to the radical $R_1$ in the alcohol $R_1OH$, said alcohol being an unsaturated monohydric alcohol having from three to ten carbon atoms and having an aliphatic unsaturated carbon-to-carbon linkage adjacent the beta carbon atom therein and $R_2$ is a radical selected from the group consisting of divalent saturated aliphatic hydrocarbon radicals and divalent aromatic hydrocarbon radicals.

2. A polymer of the compound defined by claim 1.

3. As a new compound, an ester-amide having the following structural formula:

$$CH_2=CH-CH_2-O-\overset{O}{\underset{\|}{C}}-NH-CH_2$$
$$CH_2=CH-CH_2-O-\underset{\|}{C}-NH-CH_2$$
$$\phantom{CH_2=CH-CH_2-O-}O$$

4. A polymer of the compound defined in claim 3.

5. As a new compound, an ester-amide having the following structural formula:

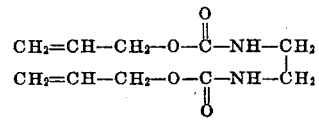

6. A polymer of the compound defined in claim 5.

7. As a new compound, an ester-amide having the following structural formula:

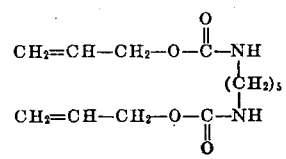

8. A polymer of the compound defined in claim 7.

IRVING E. MUSKAT.
FRANKLIN STRAIN.